US006411649B1

(12) United States Patent
Arslan et al.

(10) Patent No.: US 6,411,649 B1
(45) Date of Patent: Jun. 25, 2002

(54) ADAPTIVE CHANNEL TRACKING USING PILOT SEQUENCES

(75) Inventors: Hüseyin Arslan, Raleigh; Rajaram Ramésh, Cary, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/175,699

(22) Filed: Oct. 20, 1998

(51) Int. Cl.$^7$ ................................................ H03H 7/30

(52) U.S. Cl. ..................... 375/232; 375/342; 375/350; 375/364; 375/368; 370/512; 370/514; 370/520

(58) Field of Search ................................ 375/231, 232, 375/233, 328, 340, 342, 346, 350, 363, 364, 368; 370/506, 509, 510, 511, 512, 514, 503, 520, 528; 708/305, 322

(56) References Cited

U.S. PATENT DOCUMENTS

| | | | |
|---|---|---|---|
| 5,414,734 A | | 5/1995 | Marchetto et al. .......... 375/267 |
| 5,479,444 A | * | 12/1995 | Malkamaki et al. ........ 375/231 |
| 5,517,524 A | * | 5/1996 | Sato ............................ 375/230 |
| 5,692,015 A | * | 11/1997 | Higashi et al. .............. 375/340 |
| 5,850,393 A | * | 12/1998 | Adachi ........................ 370/335 |
| 5,901,185 A | * | 5/1999 | Hassan ........................ 375/346 |
| 6,028,852 A | * | 2/2000 | Miya et al. .................. 370/335 |
| 6,097,711 A | * | 8/2000 | Okawa et al. ............... 370/335 |

FOREIGN PATENT DOCUMENTS

| | | | |
|---|---|---|---|
| EP | 0520969 A2 | 12/1992 | ........... H04L/25/30 |
| EP | 0529585 A2 | 3/1993 | ........... H04L/25/30 |
| EP | 0715440 A1 | 6/1996 | ........... H04L/27/22 |
| WO | WO95/35615 | 12/1995 | |
| WO | WO97/39557 | 10/1997 | ........... H04L/25/03 |

OTHER PUBLICATIONS

Chong et al., "An Analysis of Pilot Symbol Assisted 16 QAM in the Rayleigh Fading Channel", IEEE, vol. 41, No. 4.
Cavers, "Pilot Symbol Assisted Modulation and Differential Detection in Fading and Delay Spread", IEEE, vol. 43, No. 7.
Cavers, Pilot Symbol Assisted Modulation in Fading and Delay Spread, IEEE, 1993, pp. 13–16.
Cavers, "An Analysis of Pilot Symbol Assisted Modulation for Rayleigh Fading Channels", IEEE Transactions on Vehicular Technology, vol. 40, No. 4, Nov. 1991, pp. 686–693.
Cavers et al., "Cochannel Interference and Pilot Symbol Assisted Modulation" IEEE, vol. 42, No. 4.
Lodge, et al., "Time Diversity for Mobile Satellite Channels Using Trells Coded Modulations", IEEE Global Telecommunications Conference, 1987, pp. 303–307.
Moher et al., "TCMP–A Modulation and Coding Strategy for Rician Fading Channels", IEEE Journal on Selected Areas in Communications, vol. 7, No. 9, Dec. 1989, pp. 1347–1355.

(List continued on next page.)

Primary Examiner—Stephen Chin
Assistant Examiner—Dac V. Ha
(74) Attorney, Agent, or Firm—Myers Bigel Sibley & Sajovec (57) ABSTRACT

Methods and systems are provided which utilize pilots in an information sequence to periodically retrain a channel estimator. Thus, a channel tracker may be synchronized using a synchronization sequence and then periodically retrained using known pilot symbols. Furthermore, the utilization of pilots may allow for the detection of errors in previous channel estimates. When errors are detected, a new channel estimate may be used based on the retraining using the pilot symbols and, optionally, previous errors in symbol estimation may be corrected. Thus, by retraining based on pilot symbols, the propagation of errors may be reduced.

28 Claims, 6 Drawing Sheets

OTHER PUBLICATIONS

Sampei, et al., "Rayleigh Fading Compensation Method for 16QAM in Digital Land Mobile Radio Channels", Proceedings of the IEEE Vehicular Technology Conference, 1989, pp. 640–646.

Lindbom, Lars, *A Wiener Filtering Approach to the Design of Tracking Algorithms With Applications in Mobile Radio Communications*, pp. 1–255 (Uppsala University 1995).

Lindbom, Lars, Simplified Kalman Estimation of Fading Mobile Radio Channels: High Performance at LMS Computational Load, Int. Conf. on Acoustics, Speech and Signal Processing, 4 pages (Apr. 1993).

Lin, Jingdong, et al., Optimal Tracking of Time–Varying Channels: A Frequency Domain Approach for Known and New Algorithms, *IEEE Transactions on Selected Areas in Communications*, vol. 13, No. 1, pp. 141–154 (Jan. 1995).

Gooch, Richard P., et al., Demodulation of Cochannel QAM Signals, *IEEE*, pp. 1392–1393, 1395 (1989).

D'Andrea, Aldo N., et al., Symbol–Aided Channel Estimation With Nonselective Rayleigh Fading Channels, *IEEE*, 9 pages (1995).

International Search Report, International Application No. PCT/US99/21609.

\* cited by examiner

ADAPTIVE CHANNEL TRACKING USING PILOT SEQUENCES

FIELD OF THE INVENTION

The present invention relates to digital communications and, in particular, to the tracking of channel response in digital wireless mobile radio systems.

BACKGROUND OF THE INVENTION

The radio channel in mobile wireless communications may be one of the most harsh mediums to operate. The transmitted signals are often reflected, scattered, diffracted, delayed and attenuated by the surrounding environment. Moreover, the environment through which the signal passes from the transmitter to the receiver is not stationary due to the mobility of the user and surrounding objects. Characteristics of the channel environment also differ from one area to another. Radio propagation in such environments is characterized by multi-path fading, shadowing, and path loss. Among those, multi-path fading may be the most important. Multi-path fading may be characterized by envelope fading, Doppler spread and time-delay spread.

Multi-path waves are combined at the receiver antenna to give a resultant signal which can vary widely in amplitude and phase. Therefore, signal strength may fluctuate rapidly over a small distance traveled or time interval, causing envelope fading. Rayleigh distribution is commonly used to describe the statistical time varying nature of the received envelope of a flat fading signal, or the envelope of an individual multi-path component. In satellite mobile radio and in micro-cellular radio, in addition to the many multi-path waves, a dominant signal, which may be a line-of-sight (LOS) signal, arrives at the receiver and gives rise to a Ricean distributed signal envelope. This dominant path significantly decreases the depth of fading depending on the Ricean parameter, K, which is defined as the ratio of the power in the dominant path to the power in the scattered paths.

Doppler shift is the frequency shift experienced by the radio signal when a wireless receiver, such as a wireless mobile terminal, is in motion. Doppler spread is a measure of the spectral broadening caused by the time rate of change of the mobile radio channel. Doppler spread may lead to frequency dispersion. The Doppler spread in the frequency domain is closely related to the rate of change in the observed signal. Hence, the adaptation time of the processes which are used in the receivers to track the channel variations should be faster than the rate of change of the channel to be able to accurately track the fluctuations in the received signal.

Each of these characteristics of the radio channel present difficulties in tracking the channel to allow for decoding of information contained in the received signal. Often, in wireless mobile radio systems, known data sequences are inserted periodically into the transmitted information sequences. Such data sequences are commonly called synchronizing sequences or training sequences and are typically provided at the beginning of a frame of data. Channel estimation may be carried out using the synchronizing sequences and other known parameters to estimate the impact the channel has on the transmitted signal. After determining the channel response, the channel estimator enters a "decision directed" mode where the symbol estimates are used to estimate the channel.

For systems where fading changes very slowly, generally, least square estimation may be an efficient way of estimating the channel impulse response in the presence of additive white Gaussian noise. Because the fading rate is slow compared to the frame rate, the channel estimates can be updated frame by frame. However, for many wireless mobile radio systems, the channel impulse response changes very rapidly over a small travel distance or time interval. With the trend in wireless communications being to move to higher frequency bands, such as in the Personal Communication Systems (PCS), the Doppler spread, hence, the rate of change in the observed signal may be further increased. Even during the reception of the synchronizing sequences, the mobile radio channel response may not be constant. Therefore, the ability to track the channel parameters for fast time-varying systems provides more robust receiver structures and enhances the receiver performance.

The most commonly used channel tracking methods are the Least Mean Square (LMS) and Recursive Least Square (RLS) based algorithms. See for example, "Optimal Tracking of Time-varying Channels: A Frequency Domain Approach for known and new algorithms," *IEEE transactions on selected areas in communications*, Vol. 13, NO. 1, January 1995, Jingdong Lin, John G. Proakis, Fuyun Ling. By incorporating prior knowledge about the channel coefficient in the estimation, stochastic based methods have recently been introduced. In contrast to the LMS and RLS, these methods provide for the extrapolation of the channel coefficients in time. More details on these approaches can be obtained in, "A wiener filtering approach to the design of tracking algorithms", Uppsala University Department of technology and signal processing group, Lars Lindbom, 1995.

One difficulty with the adaptive channel tracker methods is that during the decision directed mode the estimated symbols are used for the channel response adaptation. Therefore, the effect of using potentially incorrect decisions needs to be considered for parameter selection. Tuning of design parameters may result in a trade-off between tracking capability and sensitivity to noise. For example, if the adaptation gain of the channel tracker is very large, then, the channel tracker may become very sensitive to noise and to incorrect symbol decisions. On the other hand, if the adaptation gain is chosen to have a small magnitude, the ability to track the variation of the channel parameters may be lost. Specifically, in those systems where coherent modulation and coherent demodulation schemes are used, these issues become more serious compared to systems where differential modulations are implemented.

In coherent modulation schemes (like coherent Quadrature Phase Shift Keying (QPSK)), even if the channel tracker tracks the magnitude of the channel response well, the channel phase may frequently slip (i.e., the tracker can lock on a wrong phase offset) during a deep fade of the in-phase and/or quadrature phase component of the channel, and the phase would be off by $k2\pi/m$. In other words, the tracker actually tracks well but with an offset, which consequently causes symbol rotation and error propagation. Because the channel phase rotation and symbol rotation are in the opposite direction, a conventional tracker is not able to correct the problem. Thus, all the remaining information symbols may be lost because of this phase rotation until a new frame and synchronization sequence is received.

SUMMARY OF THE INVENTION

In light of the above discussion, it is an object of the present invention to provide channel tracking which compensates for variations in the channel including channel fade.

These and other objects of the present invention are provided by utilizing pilots in an information sequence to periodically retrain a channel estimator. Thus, a channel tracker may be synchronized using a synchronization sequence and then periodically retrained using known pilot symbols. Furthermore, the utilization of pilots may allow for the detection of errors in previous channel estimates. When errors are detected, a new channel estimate may be used based on the retraining using the pilot symbols and, optionally, previous errors in symbol estimation may be corrected. Thus, by retraining based on pilot symbols, the propagation of errors may be reduced.

In a particular embodiment, methods and systems are provided which track the channel impulse response of a signal received by a wireless device by estimating the channel impulse response of the received signal during a synchronizing period of a received frame and retraining the channel impulse response during a pilot period within the received frame. Furthermore, the channel impulse response may also be estimated based on estimated symbol values during information periods of the received frame.

In a particular embodiment, the estimate of the channel impulse response is determined by a channel tracker. In such an embodiment, the channel tracker may be placed in a training mode during at least one pilot period of the received frame. Furthermore, the channel tracker may be placed in decision directed mode during at least one information period the received frame. Such a two mode operation may also allow for increasing the gain of the channel tracker when the channel tracker is placed in training mode and decreasing the gain of the channel tracker when the channel tracker is placed in decision directed mode.

In another embodiment of the present invention the channel impulse response of the received signal is estimated during the synchronizing period of the received frame by first determining an average channel impulse response estimate based on a plurality of symbols in during the synchronizing period. The estimated channel impulse responses for symbols in the plurality of symbols, in symbol order, and wherein the initial symbol estimate for a symbol in the plurality of symbols is based on the determined average channel impulse response.

In yet another embodiment of the present invention, phase slip occurrences or channel estimate deviations from the real channel are detected in the signal received by the wireless device. Such a determination may be made by comparing a determined channel impulse response determined during an information period of the received frame to a determined channel impulse response determined during a pilot period of a frame to determine the difference in phase between the channel impulse responses. A phase slip occurrence or channel estimate deviation may then be detected based on the determined difference.

Furthermore, the comparison may be made by comparing a determined channel impulse response determined during an information period of the received frame corresponding to a first information symbol to a determined channel impulse response determined during a pilot period of a frame corresponding to a pilot symbol immediately subsequent to the first information symbol to determine the difference in phase between the channel impulse responses. In such a case, the determined channel impulse response determined during a pilot period of a frame corresponding to a pilot symbol immediately subsequent to the first information symbol may be determined by re-determining channel impulse responses in a reverse direction from determined channel impulse responses corresponding to pilot symbols subsequent to the pilot symbol immediately subsequent to the first information symbol.

In yet another embodiment of the present invention, the determined channel impulse response corresponding to the first information symbol may be discarded and subsequent tracking performed utilizing the determined channel estimate corresponding to a pilot symbol subsequent to the first information symbol.

In a symbol correcting embodiment of the present invention, the determined channel impulse responses for symbols prior to the pilot symbol subsequent to the first information symbol are compared. Backwards re-tracking to prior symbols from the pilot symbol immediately subsequent to the first information symbol is carried out until the difference between the determined channel impulse response corresponding to the pilot symbol subsequent to the first information symbol and a determined channel impulse response corresponding to a symbol prior to the first information symbol is less than a predefined threshold so as to determine an initial symbol. Symbol estimates may be revised utilizing the determined channel impulse response corresponding to the pilot symbol subsequent to the initial symbol and until and including the first information symbol.

As will be appreciated by those of skill in the art, the present invention may also be embodied in a radiotelephone.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects. Like numerals refer to the same items throughout the present disclosure.

Figure 1:
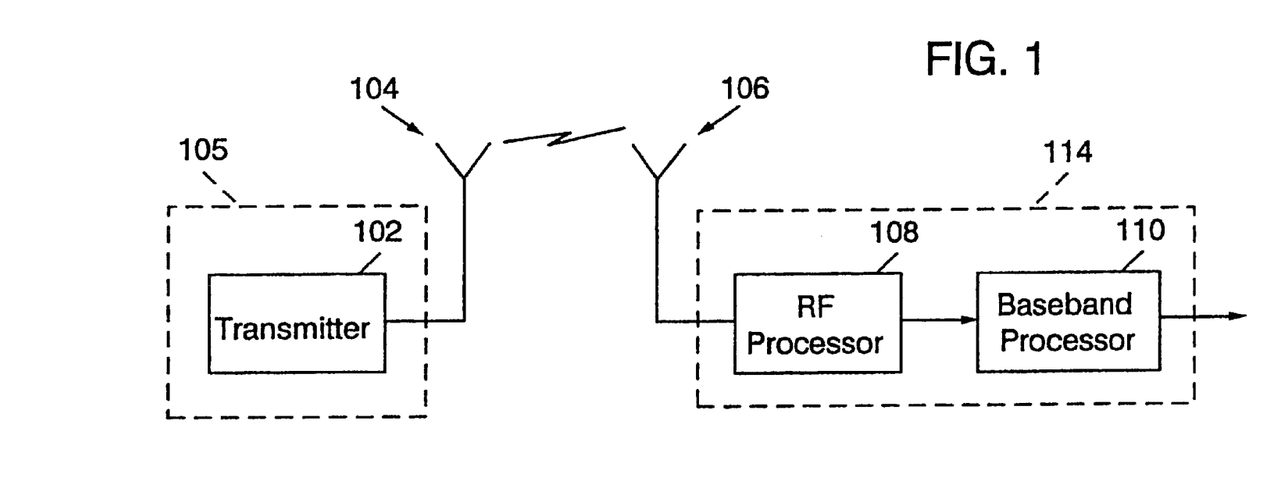
FIG. 1 illustrates a radio communication system in which the teaching of the present invention can be utilized.

FIG. 1 depicts a radio communications system 100 such as a cellular or satellite telephone system, in which the teachings of the present invention can be utilized. As shown in FIG. 1, the radio communications system 100 includes a radio transmitter 102 having a transmit antenna 104, and a radio receiver 114. The radio receiver 114 includes a receive antenna 106, a radio frequency processor 108, and a baseband processor 110. An output of the radio transmitter 102 is coupled to the transmit antenna 104. The receive antenna 106 is coupled to a radio frequency processor 108. The output of the radio processor is provided to the inputs of the baseband processor 110.

In operation, the transmitter 102 transmits an information signal (modulated at a carrier frequency specified by the system and regulatory agencies and suitable for radio communication). The transmitted signal reaches the radio receiver 114 after passing through a propagation medium. The transmitted signal plus any noise are received at the receiver antenna 106. The received signal is processed by the radio frequency processor 108 to produce a baseband signal corresponding to the desired carrier frequency.

Specifically, the radio processor 108 amplifies, mixes, filter, samples, and quantizes the signal to extract the baseband signal corresponding to the desired carrier frequency. The resulting baseband signal is provided to the baseband processor 110 for demodulation of the transmitted information signal.

The present invention utilizes pilot symbols inserted in a frame of data in a received signal to periodically retrain a channel tracker during communication. Thus, the channel tracker may more accurately track changes in the channel impulse response of the channel corresponding to the received signal. Thus, the present invention may be incorporated in the baseband processor 110 and be utilized in demodulating the received signal to extract the transmitted information.

Figure 2:
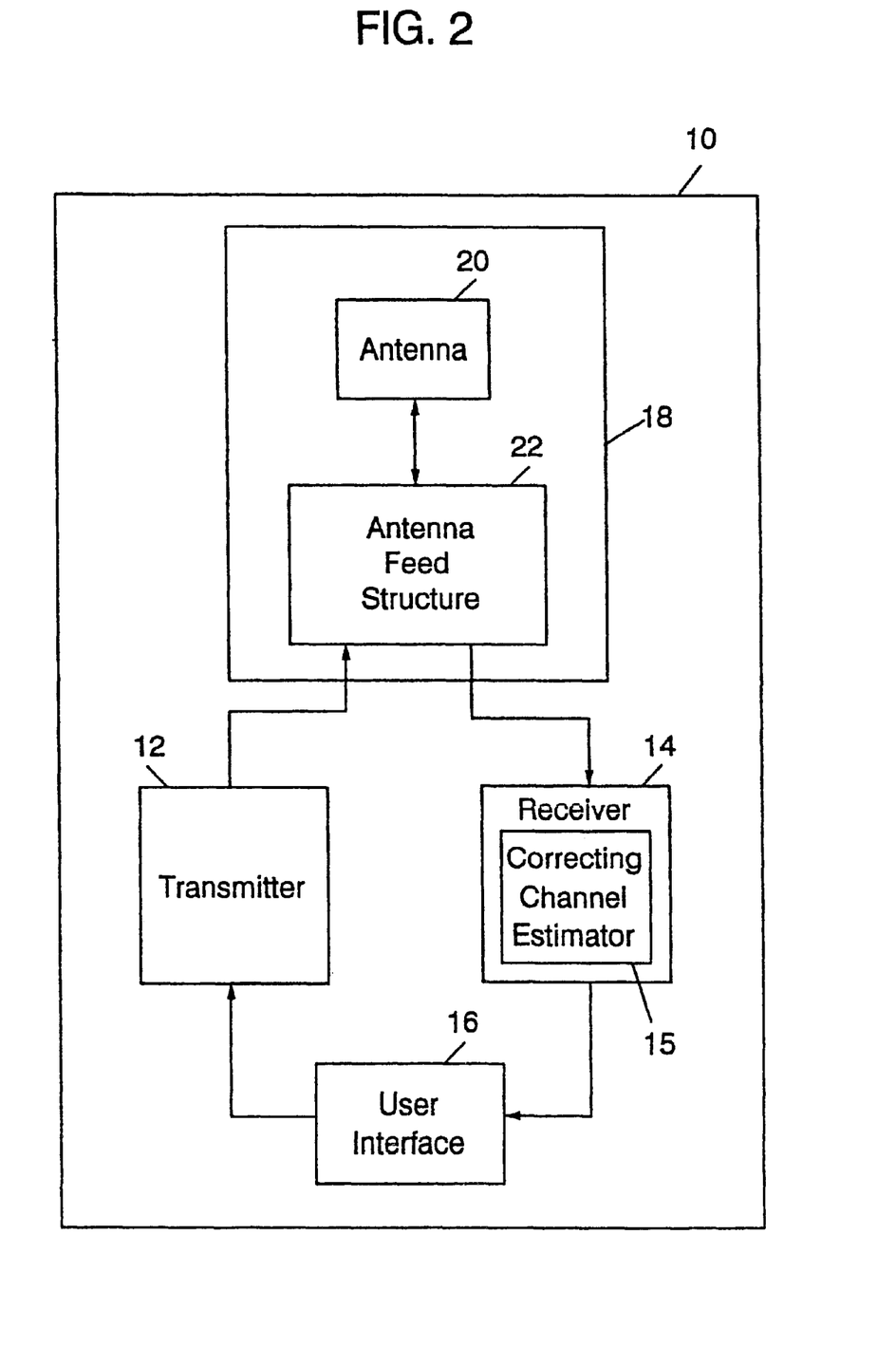
FIG. 2 is a block diagram of a radiotelephone according to the present invention.

An embodiment of a radiotelephone 10 which includes a correcting channel estimator 15 according to the present invention is depicted in the block diagram of FIG. 2. As shown in FIG. 2, radiotelephone 10 typically includes a transmitter 12, a receiver 14, a user interface 16 and an antenna system 18. The antenna system 18 may include an antenna feed structure 22 and an antenna 20. As is well known to those of skill in the art, transmitter 12 converts the information which is to be transmitted by radiotelephone 10 into an electromagnetic signal suitable for radio communications. Receiver 14 demodulates electromagnetic signals which are received by radiotelephone 10 so as to provide the information contained in the signals to user interface 16 in a format which is understandable to the user. A wide variety of transmitters 12, receivers 14, user interfaces 16 (e.g., microphones, keypads, displays) which are suitable for use with handheld radiotelephones are known to those of skill in the art, and such devices may be implemented in radiotelephone 10. Other than the correcting channel estimator 15 according to the present invention, the design of radiotelephone 10 is well known to those of skill in the art and will not be further described herein.

Figure 3:
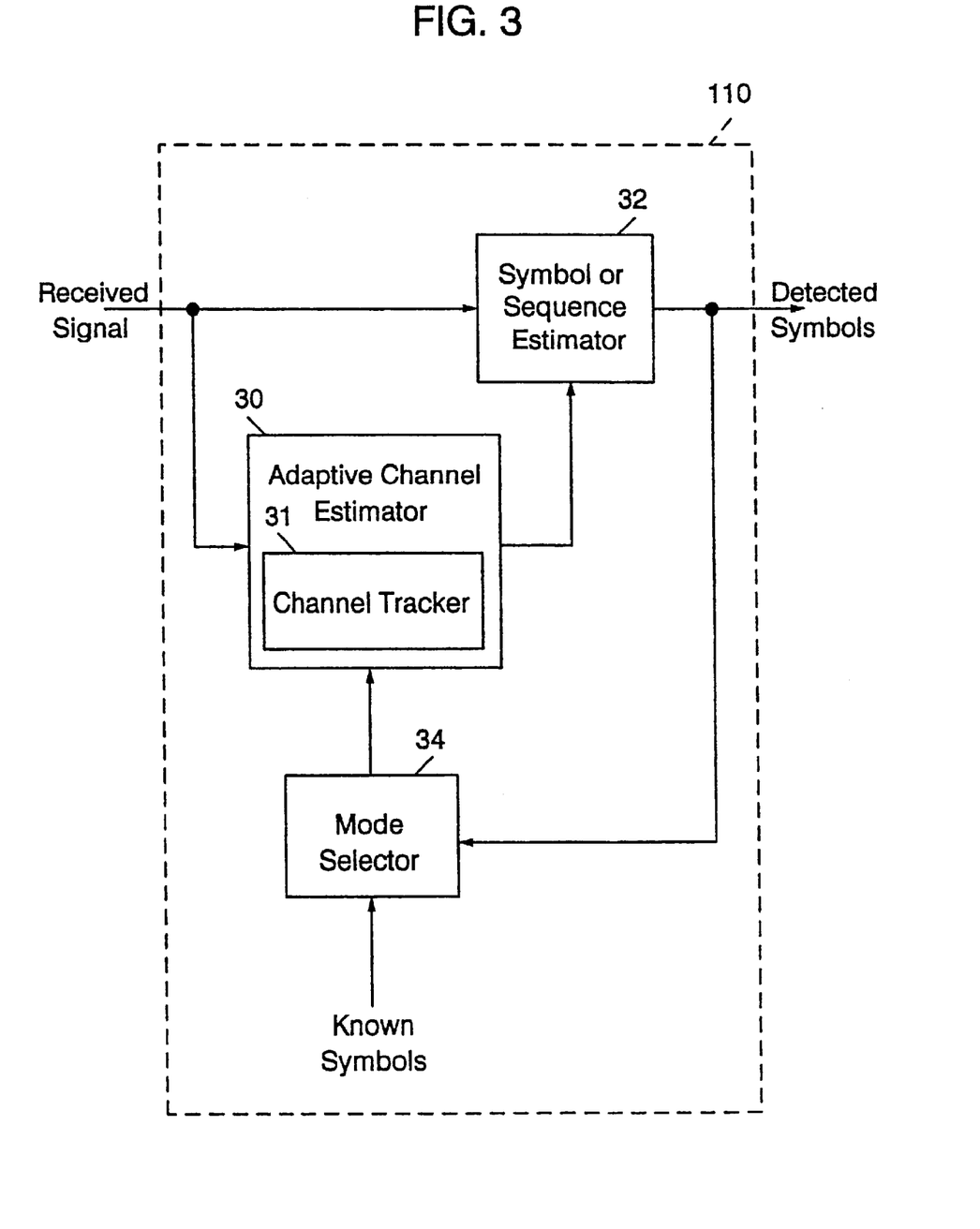
FIG. 3 is a block diagram of a baseband processor according to the present invention.

FIG. 3 depicts a baseband processor 110 according to the present invention. As shown, the received baseband signal is provided to both the inputs of adaptive channel estimator 30 (which includes a channel tracker 31) and symbol or sequence estimator 32. The output of the adaptive channel estimator 30 is also provided to the symbol or sequence estimator 32. The output of symbol or sequence estimator 32 is provided to a mode selector 34. The output of the mode selector 34 is provided as an input to the adaptive channel estimator 30. As is further seen in FIG. 3, the mode selector 34 is also provided known symbols. These known symbol may correspond to the known symbols of a synchronizing period or of a pilot period in a received frame of information. The mode selector 34 selects between a training mode where known symbols are utilized to train the channel tracker 31 and a decision directed mode where the channel tracker 31 tracks the channel based on previous channel estimates.

Figure 4:
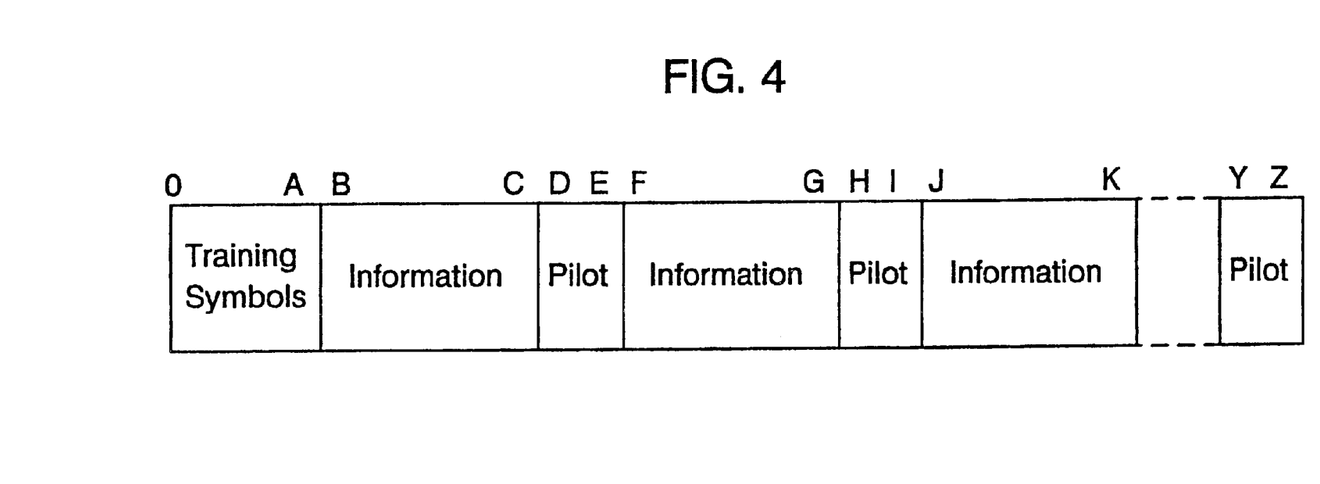
FIG. 4 illustrates a specific frame structure according to one embodiment of the present invention.

FIG. 4 illustrates a frame structure which may be utilized with the present invention. As seen in FIG. 4, the frame includes a synchronizing portion 0 to A using training symbols, information portions B–C, F–G and J–K and pilot portions D–E, H–I and Y–Z. According to the present invention, the pilot portions are interspersed between information portions so as to allow retraining of the adaptive channel estimator 30 during the frame. The synchronizing portion of the frame is a series of predefined symbols, from 0 to A in FIG. 4, which are the same for each received frame. The information portion of the frame, from B to C, F to G and J to K, contains symbols which may vary from frame to frame and contain the information to be transmitted in the frame. The pilot portions of the frame, from D to E, H to I and Y to Z, contain predefined symbols which may be used to retrain the adaptive channel estimator 30. As will be appreciated by those of skill in the art in light of the present disclosure, the frame structure of FIG. 4 is merely illustrative and the present invention should not be construed as limited to any particular frame structure but may be used with any frame structure which includes pilots.

Preferably, the pilot sequences inserted into a go frame are of sufficient length so as to allow for accurate retraining of the channel estimate. However, in a fixed frame length, the length of the pilot sequences represents a trade off between channel estimate accuracy and the amount of information symbols in a frame. Accordingly, while the pilot sequence length may be any length which includes at least one symbol, pilot sequence length of from about 2 to about 4 symbols may be suitable.

Similarly, the frequency of occurrence of pilot sequences in a frame may also depend on the specific application, as the pilot frequency should be sufficient to allow accurate symbol estimation over the duration of a frame but not so often as to unacceptably degrade performance in the reduction of information in a frame. For example, more pilots may be beneficial in a phase shift encoded protocol which detects 4 bits per symbol than one which detects 2 bits per symbol as a result of the higher accuracy needed to detect $2^4$ levels of phase shift as opposed to 4. Thus, while the present invention should not be construed as limited to any particular number of pilot sequences per frame, from about 2 to about 6 pilot sequences per frame may be beneficial. As will be appreciated by those of skill in the art, depending on the rate of change of the channel (Doppler spread), the number of pilot sequences may change. For low Doppler spread, less sequences may be needed and for higher Doppler spread, more sequences are preferred.

In operation, during the synchronizing period of each frame, the mode selector 34 provides known symbols to the adaptive channel estimator 30. These symbols may, for example, be stored in memory and accessed during the synchronization portion of a received frame. During the synchronization portion of the received frame, the channel estimator 30 estimates the channel impulse response using any number of well known methods of channel estimation. For example, a least square (LS) estimator may be utilized which minimizes the squared difference between the actual received signal and the reconstructed signal based on the known symbol of the synchronization portion of the frame.

These initial estimates which are obtained by the LS estimator are used as initial estimates for the channel tracker 31. Because the channel may change very rapidly, and an LS estimator provides an average channel parameter estimation during the training period, it is not desirable to use these initial estimates (starting from the first information symbol after the synchronizing period (represented as B in FIG. 4) of the information field just after the synchronization sequence) for tracking the channel impulse response. Instead, a channel tracker 31 portion of the adaptive channel estimator 30 begins tracking the channel from the first symbol (represented as 0 in FIG. 4) of the synchronization sequence using the initial estimates provided by least square determination and tracks the channel until the last symbol (A) of the synchronization sequence in the training mode. The channel estimate at this point (A) is more reliable than the average channel estimate obtained by the least square determination. Thus, during the synchronization sequence, the channel tracker 31 will typically converge to a reasonable value and the estimates at the end of the training period (A) will follow the changes in the channel during the training mode.

After the training sequence, the mode selector 34 changes to decision directed mode and provides the output of the symbol or sequence estimator 32 to the adaptive channel estimator 30. Thus, starting from the first symbol (B) of the information sequence just after the training sequence, the estimated symbols at the output of the symbol or sequence estimator are used for the estimation of channel impulse response. The channel estimation in decision directed mode continues until the last symbol (C) of the first information sequence.

While the channel tracker 31 is operating in decision directed mode, the channel tracker 31 may lose the ability to track the real radio channel depending on the parameter selection. Furthermore, the channel tracker 31 may be able to closely follow the amplitude of the channel but the phase of the estimated parameters might slip with respect to the actual channel. These errors may propagate as incorrect channel estimates which may result in incorrect symbol estimates which may further result in incorrect channel estimates. By inserting pilots in the sequence of the frame, an opportunity is provided to re-train the channel response.

Figure 5:
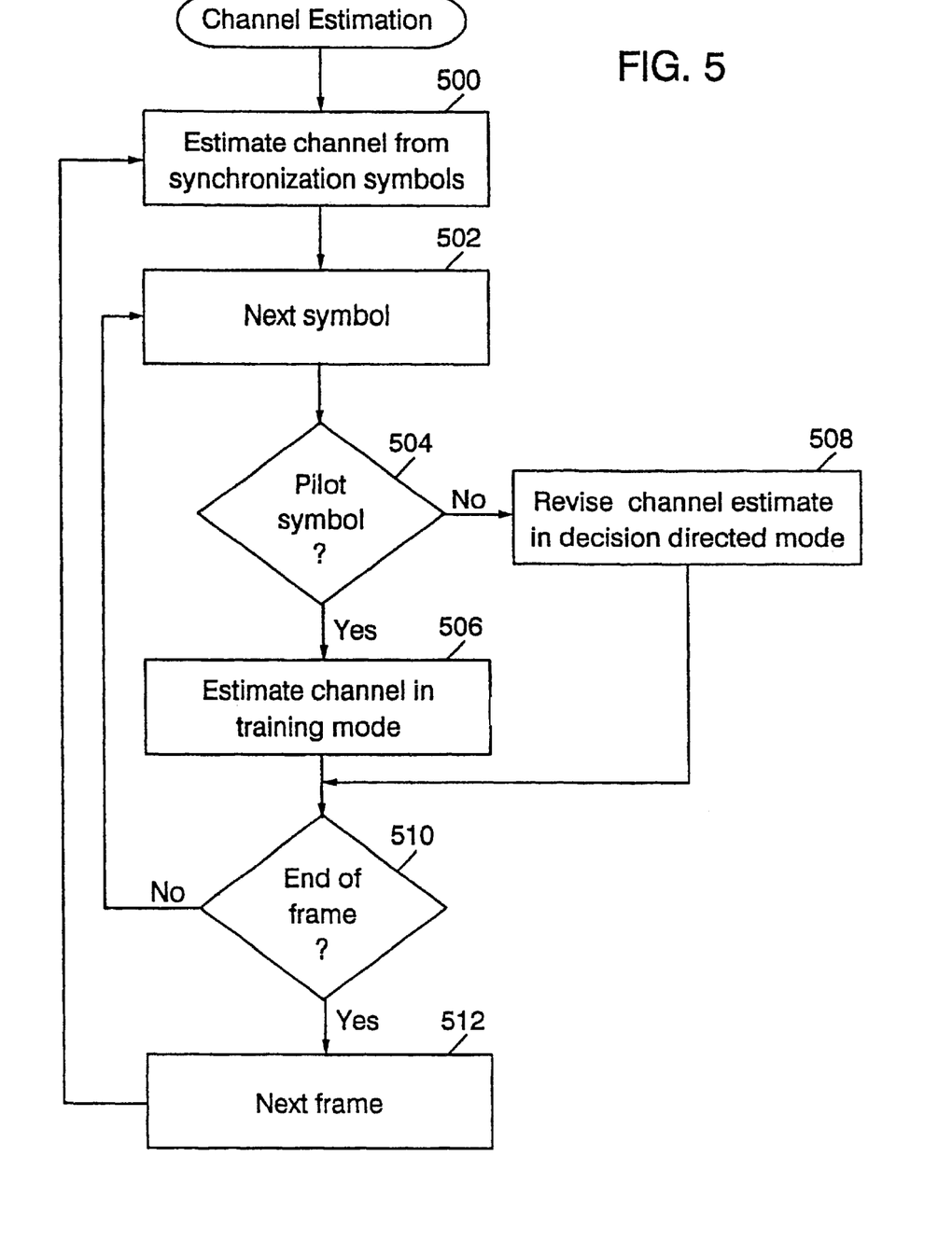
FIG. 5 is a flow chart illustrating operations according to one embodiment of the present invention.

FIG. 5 further illustrates the operations of a first embodiment of the present invention utilizing the pilots in a received frame. This embodiment of the present invention utilizes the pilot symbols to re-train the channel impulse response with known symbols.

As seen in FIG. 5, the process begins as described above by the estimation of the channel impulse response during the synchronizing sequence (0 to A) by the adaptive channel estimator (block 500). The process then continues a symbol at a time by obtaining the next symbol (block 502) and determining if the symbol is a pilot symbol (block 504). If the symbol is not a pilot symbol, then the symbol is an information symbol and the adaptive channel estimator 30 is placed in decision directed mode and the estimated symbols are fed back to the adaptive channel estimator 30 by the mode selector 34 (block 508). This operation continues until a pilot symbol is reached. At that point, the mode selector 34 returns the adaptive channel estimator 30 to training mode and again provides known symbols to the adaptive channel estimator 30 rather than estimated symbols (block 506). This process may repeat until the frame is complete and then the process continues with the next frame, beginning with synchronization (block 510 and block 500).

Thus, with respect to the frame of FIG. 4, the operations of the present invention illustrated in FIG. 5 would result in the following occurring. After synchronization, as described above, when the pilot symbol D is reached, the channel tracker 31 is switched to the training mode by the mode selector 34. The channel tracker 31 then uses the known symbols of D to E to re-train the channel response using the initial estimates obtained by the last symbol C of the first information sequence. The training mode continues until the last symbol E of the first pilot field is reached. Starting from the first symbol F of the second information field, the channel tracker 31 switches back to the decision directed mode. The channel tracker 31 continues to operate likewise until the last symbol Z of the frame. Thus, the pilot symbols provide the opportunity to retrain the channel response and reduce the likelihood of further propagation of error.

Because the channel tracker 31 operates in two different modes (training and decision directed mode), the parameters of the channel tracker 31 can be changed adaptively during these different modes to obtain a more robust channel estimate. For example, during the synchronization sequence and pilot sequences, the adaptation gain (i.e. the rate at which the channel tracker adapts to changes in the channel) of the channel tracker 31 can be increased to enhance tracking ability. Similarly, during the decision directed mode, the adaptation gain can be decreased to reduce the sensitivity of the channel tracker to noise and to incorrect symbol decisions.

Figure 6:
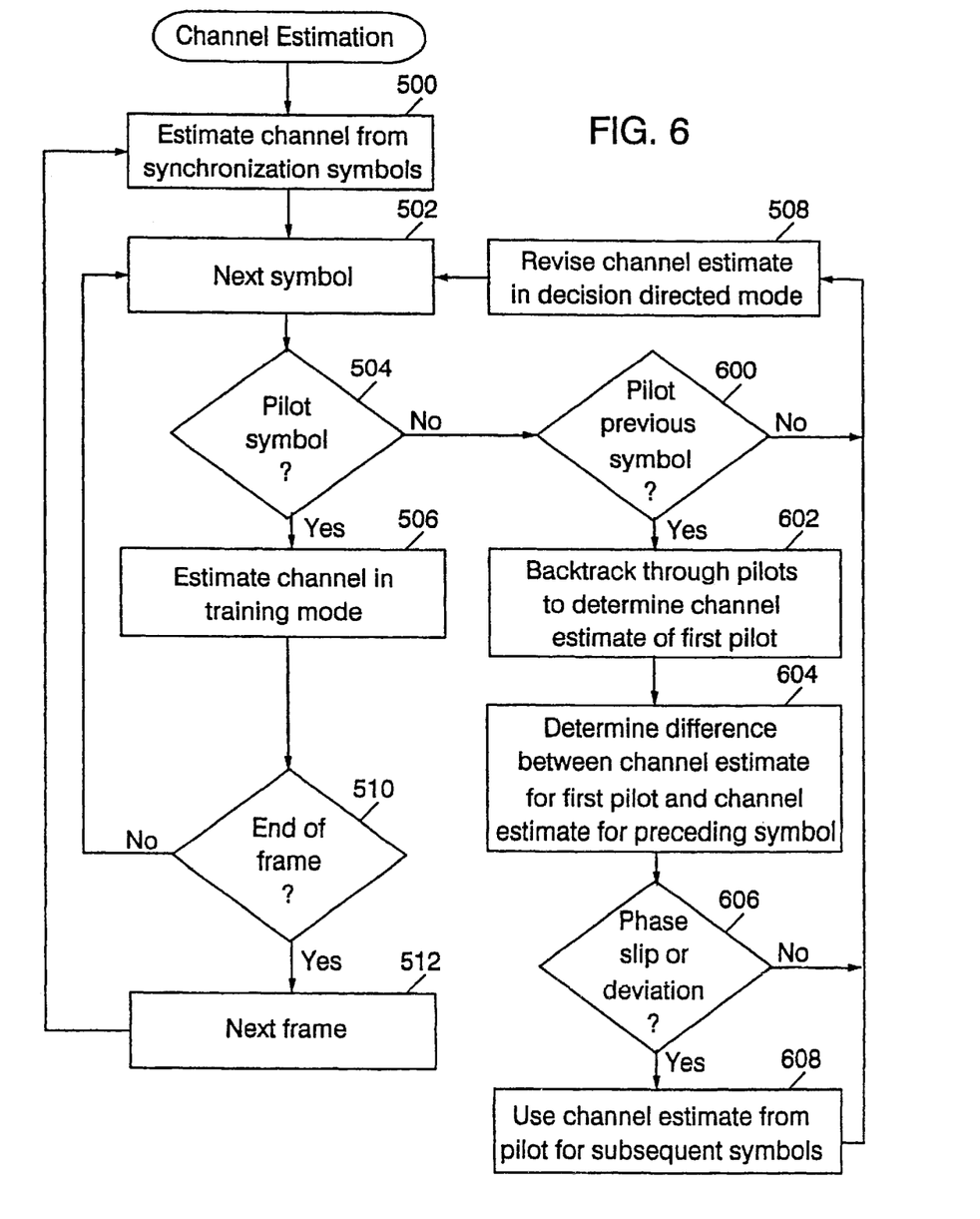
FIG. 6 is a flow chart illustrating operations according to a first alternative embodiment of the present invention.

FIG. 6 illustrates a further embodiment of the present invention. As seen in FIG. 6, the operations of the present invention initially proceed as described with respect to FIG. 5. However, this second embodiment additionally detects the occurrence of phase slip prior to the pilot sequence and/or deviation of the estimated channel response from the real channel. Thus, during the pilot symbol sequence, the channel impulse response is estimated independently. The phase of the channel response estimate and the phase of the channel response obtained in the decision directed mode at the end of the information sequence (for example the channel response at point D and C) are compared. A decision is made based on the difference of these two phase values. A phase slip occurrence prior to the pilot symbol sequence is present if the difference is greater than a preselected threshold value. Similarly, deviation of the estimated channel response from the real channel may be determined by looking at both phase and magnitude of the channel impulse responses at the last symbol instance of the information sequences and at the first symbol instance of the pilot sequences. As will be appreciated by those of skill in the art in light of the present disclosure, the value of the threshold values depends on the modulation method (e.g. coherent BPSK, coherent QPSK or B-PSK) and the noise level. Accordingly, a wide range of threshold values may be utilized with the present invention.

FIG. 6 illustrates these operations for a LS implementation of a channel tracker. In such an implementation, an average of the channel response is obtained. To obtain the channel response for particular symbols, (for example the symbol beginning the pilot sequence), the channel responses are re-estimated by using the tracker in the reverse direction. During the pilot sequence, a least squares estimate is used to obtain an average channel estimate over the pilots (for example pilots D–E). Then, using the averaged channel estimation, the channel estimation for a specific symbol can be obtained by tracking the least squares estimation used first to obtain the average channel estimate, then to obtain the value of the channel estimate at point D.

The channel tracker is used with the initial average estimate from point E backwards to point D. These operations are illustrated in FIG. 6.

As seen in FIG. 6, if the symbol is not a pilot symbol, then it is determined if the previous symbol was the last pilot symbol in the sequence (block 504 and block 600). If the previous pilot symbol is the last pilot symbol in the sequence, then, starting from the last pilot symbol of the pilot and until the first symbol of the pilot sequence, the channel estimates are re-estimated in the training mode (block 602). When the channel estimate for the first symbol of the pilot sequence is determined, the channel estimate is compared to the channel estimate of the last information symbol of the information sequence immediately prior to the pilot sequence (for example, C and D), as described above, to determine if phase slip or deviation has occurred (block 604 and block 606). Once a decision is made about either phase slip and/or channel estimate deviation, then, if phase slip or deviation are present, the ongoing channel estimate at the last symbol of the previous information sequence is thrown away, and the LS estimate during the pilot is used. Tracking continues from the first symbol of the pilot (block 608). Thus, by providing a decision about whether the ongoing channel estimates should be used as a starting point during the pilot or discarding the ongoing estimates and restarting from scratch using the pilots, the performance of the channel tracker 31 may be improved.

Figure 7:
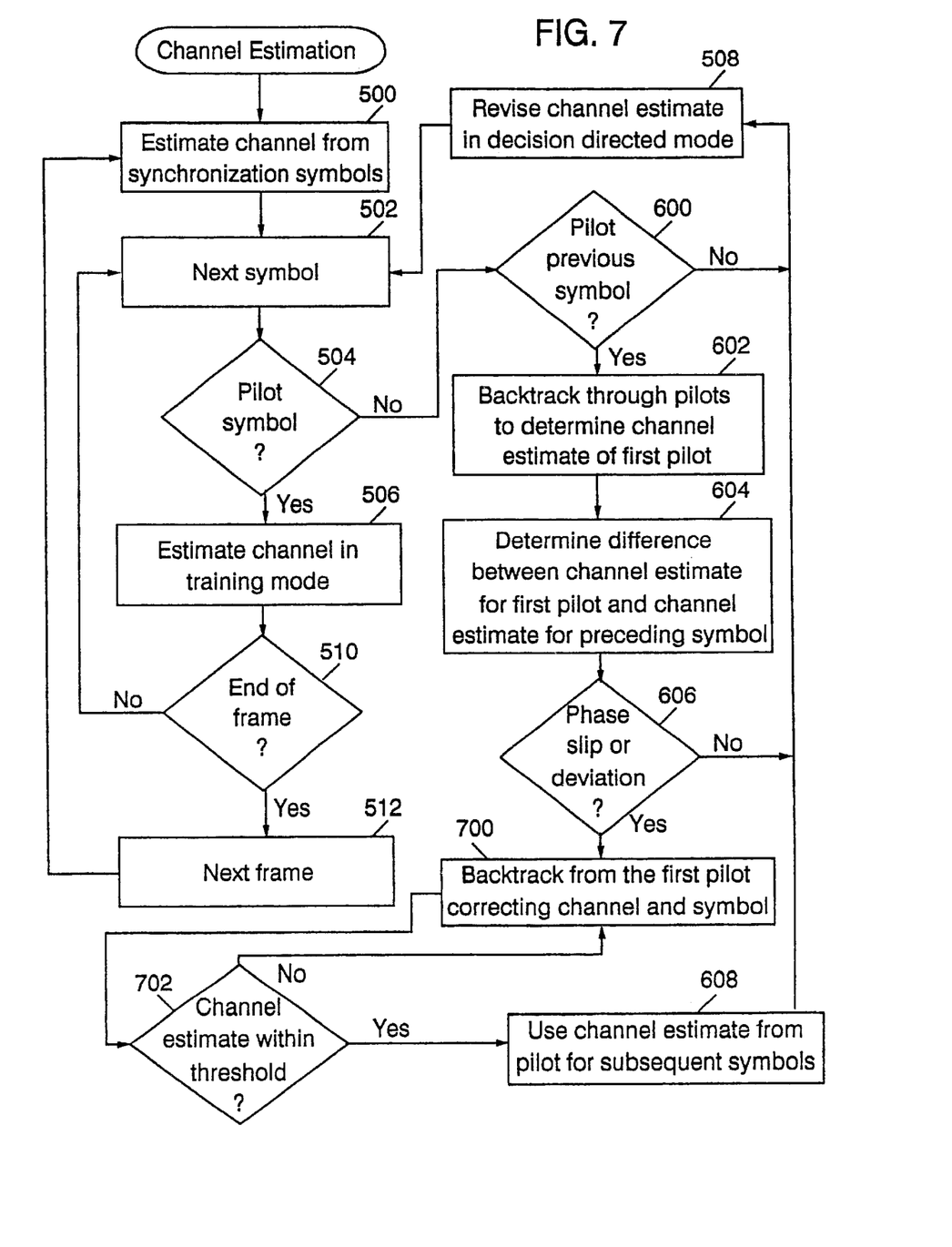
FIG. 7 is a flow chart illustrating operations according to a second alternative embodiment of the present invention.

A still further embodiment of channel tracking according to the present invention is illustrated in FIG. 7. FIG. 7 illustrates a bi-directional tracking approach. As seen in FIG. 7, the operations of the present invention initially proceed as described with respect to FIG. 6, however, if phase slip or deviation is detected (block 606), then, using the channel estimate obtained during the pilots at the very beginning of the pilot sequence, a backward re-tracking in the reverse direction is performed (block 700). During the backward tracking, after each backward channel estimation, new symbols may be estimated based on the new channel estimates.

Thus, backward re-tracking and symbol correction continues until the error in the channel estimate is no longer present. The estimated channel impulse response may be compared with the previously estimated channel impulse response. When these two channel responses converge to each other, then backward re-training operation is stopped (block 702). The convergence decision is made by comparing the difference of the channel phases an/or channel amplitudes of the previously estimated and currently estimated channel impulse responses. A convergence decision is made if the difference is smaller than a pre-specified threshold value. As a result, by using a bi-directional tracking scheme, not only the error propagation problem after the pilots is eliminated, but also the error propagation problem prior to the pilots is reduced.

Although in the present embodiment the channel estimates (the ongoing decision directed channel estimate and the channel estimate obtained with the pilots) are used to compare and detect phase slips (or for the convergence decision in the backward re-tracking the old and new channel estimates are compared), it is also possible to use the symbol values to detect phase slips and make a convergence decision. For example, the symbol estimate at the first pilot may be made using the ongoing channel tracker (point D for example). Then, this estimated symbol value is compared with the already known symbol value for the pilot. If these values differ, then it is determined that a phase slip occurrence has occurred.

The present invention has been described with respect to a simplified stochastic modeling of the coefficients of a Finite Impulse Response (FIR) channel model and an approximation of a Kalman predictor as explained in Lars Lindbom, "Simplified Kalman Estimation of Fading Mobile Radio Channels: High Performance at LMS Computational Load," *International Conference on Acoustics, Speech and Signal Processing*, Minneapolis, April 1993. However, those skilled in the art will appreciate that the invention is applicable to any kind of tracking algorithm.

Furthermore, while the present invention has been described with respect to frames and symbols, these terms are used in a generic sense. Thus, a frame generically refers to a predefined data sequence. A symbol generically refers to an information unit such as, for example, a bit.

The present invention has been described with respect to FIGS. 5 through 7 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of tracking channel impulse response of a signal received by a wireless device, the method comprising:
   estimating the channel impulse response of the received signal during a synchronizing period of a received frame;
   estimating the channel impulse response based on estimated symbol values during information periods of the received frame by placing the channel tracker in decision directed mode during at least one information period of the received frame;
   retraining the channel impulse response during a pilot period interspersed within the received frame by placing the channel tracker in a training mode during at least one pilot period of the received frame;
   increasing a gain of the channel tracker when the channel tracker is placed in training mode; and
   decreasing the gain of the channel tracker when the channel tracker is placed in decision directed mode.

2. A method according to claim 1, wherein said step of estimating the channel impulse response of the received signal during a synchronizing period of a received frame comprises the steps of:
   determining an average channel impulse response estimate based on a plurality of symbols during the synchronizing period; and determining estimated channel impulse responses for symbols in the plurality of symbols, in symbol order, and wherein the initial symbol estimate for a symbol in the plurality of symbols is based on the determined average channel impulse response.

3. A method according to claim 1, further comprising the step of detecting at least one of phase slip occurrence and channel estimate deviation from the real channel in the signal received by the wireless device.

4. A method of tracking channel impulse response of a signal received by a wireless device, the method comprising:
estimating the channel impulse response of the received signal during a synchronizing period of a received frame;
retraining the channel impulse response during a pilot period within the received frame;
estimating the channel impulse response based on estimated symbol values during information periods of the received frame; and
detecting at least one of phase slip occurrence and channel estimate deviation from the real channel in the signal received by the wireless device; and
wherein the step of detecting at least one of phase slip occurrence and channel estimate deviation from the real channel in the signal received by the wireless device comprises the steps of:
determining an estimated symbol value for a symbol in the pilot period utilizing the estimated channel impulse response;
comparing the estimated symbol value for the symbol in the pilot period with a known symbol value for the symbol in the pilot period; and
detecting at least one of a phase slip occurrence and a channel estimate deviation if the estimated symbol value and the known symbol value are different symbol values.

5. A method of tracking channel impulse response of a signal received by a wireless device, the method comprising:
estimating the channel impulse response of the received signal during a synchronizing period of a received frame;
retraining the channel impulse response during a pilot period within the received frame;
estimating the channel impulse response based on estimated symbol values during information periods of the received frame; and detecting at least one of phase slip occurrence and channel estimate deviation from the real channel in the signal received by the wireless device; and
wherein said step of detecting at least one of phase slip occurrence and channel estimate deviation from the real channel comprises the steps of:
comparing a determined channel impulse response determined during an information period of the received frame to a determined channel impulse response determined during a pilot period of a frame to determine the difference in phase between the channel impulse responses; and
determining if at least one of phase slip occurrence and channel estimate deviation has occurred based on the determined difference.

6. A method according to claim 5, wherein said comparing step comprises the step of comparing a determined channel impulse response determined during an information period of the received frame corresponding to a first information symbol to a determined channel impulse response determined during a pilot period of a frame corresponding to a pilot symbol immediately subsequent to the first information symbol to determine the difference in phase between channel impulse responses.

7. A method according to claim 6, wherein the determined channel impulse response determined during a pilot period of a frame corresponding to a pilot symbol immediately subsequent to the first information symbol is determined by re-determining channel impulse responses in a reverse direction from determined channel impulse responses corresponding to pilot symbols subsequent to the pilot symbol immediately subsequent to the first information symbol.

8. A method according to claim 5, further comprising the step of discarding the determined channel impulse response corresponding to the first information symbol and subsequently tracking utilizing the determined channel estimate corresponding to a pilot symbol subsequent to the first information symbol.

9. A method according to claim 5, wherein the estimate of the channel impulse response is determined by a channel tracker, the method further comprising the steps of:
placing the channel tracker in a training mode during at least one pilot period of the received frame; and
placing the channel tracker in decision directed mode during at least one information period the received frame.

10. A method according to claim 9, further comprising the steps of:
increasing a gain of the channel tracker when the channel tracker is placed in training mode; and
decreasing the gain of the channel tracker when the channel tracker is placed in decision directed mode.

11. A method according to claim 5, further comprising the steps of:
comparing determined channel impulse responses for symbols prior to the pilot symbol subsequent to the first information symbol;
re-tracking backwards to prior symbols from the pilot symbol immediately subsequent to the first information symbol until the difference between the determined channel impulse response corresponding to the pilot symbol subsequent to the first information symbol and a determined channel impulse response corresponding to a symbol prior to the first information symbol is less than a predefined threshold so as to determine an initial symbol.

12. A method according to claim 11, further comprising the steps of:
revising symbol estimates utilizing the determined channel impulse response corresponding to the pilot symbol subsequent to the initial symbol and until and including the first information symbol.

13. A method according to claim 11, wherein the estimate of the channel impulse response is determined by Age a channel tracker, the method further comprising the steps of:
placing the channel tracker in a training mode during at least one pilot period of the received frame; and
placing the channel tracker in decision directed mode during at least one information period the received frame.

14. A method according to claim 13, further comprising the steps of:
increasing a gain of the channel tracker when the channel tracker is placed in training mode; and decreasing the gain of the channel tracker when the channel tracker is placed in decision directed mode.

15. A system for tracking channel impulse response of a signal received by a wireless device, comprising:
   a channel tracker which determines an estimate of the channel impulse;
   means for estimating the channel impulse response of the received signal during a synchronizing period of a received frame;
   means for estimating the channel impulse response based on estimated symbol values during information periods of the received frame by placing the channel tracker in decision directed mode during at least one information period the received frame;
   means for retraining the channel impulse response during a pilot period interspersed within the received frame by placing the channel tracker in a training mode during at least one pilot period of the received frame;
   means for increasing a gain of the channel tracker when the channel tracker is placed in training mode; and
   means for decreasing the gain of the channel tracker when the channel tracker is placed in decision directed mode.

16. A system according to claim 15, wherein said means for estimating the channel impulse response of the received signal during a synchronizing period of a received frame comprises:
   means for determining an average channel impulse response estimate based on a plurality of symbols in during the synchronizing period; and
   means for determining estimated channel impulse responses for symbols in the plurality of symbols, in symbol order, and wherein the initial symbol estimate for a symbol in the plurality of symbols is based on the determined average channel impulse response.

17. A system according to claim 15, further comprising means for detecting at least one of phase slip occurrence and channel estimate deviation from the real channel in the signal received by the wireless device.

18. A system for tracking channel impulse response of a signal received by a wireless device, comprising:
   means for estimating the channel impulse response of the received signal during a synchronizing period of a received frame;
   means for estimating the channel impulse response based on estimated symbol values during information periods of the received frame;
   means for retraining the channel impulse response during a pilot period within the received frame; and
   means for detecting at least one of phase slip occurrence and channel estimate deviation from the real channel in the signal received by the wireless device;
   wherein the means for detecting at least one of phase slip occurrence and channel estimate deviation from the real channel in the signal received by the wireless device comprises:
      means for determining an estimated symbol value for a symbol in the pilot period utilizing the estimated channel impulse response;
      means for comparing the estimated symbol value for the symbol in the pilot period with a known symbol value for the symbol in the pilot period; and
      means for detecting at least one of a phase slip occurrence and a channel estimate deviation if the estimated symbol value and the known symbol value are different symbol values.

19. A system for tracking channel impulse response of a signal received by a wireless device, comprising:
   means for estimating the channel impulse response of the received signal during a synchronizing period of a received frame;
   means for estimating the channel impulse response based on estimated symbol values during information periods of the received frame;
   means for retraining the channel impulse response during a pilot period within the received frame; and means for detecting at least one of phase slip occurrence and channel estimate deviation from the real channel in the signal received by the wireless device;
   wherein said means for detecting at least one of phase slip occurrence and channel estimate deviation from the real channel comprises:
      means for comparing a determined channel impulse response determined during an information period of the received frame to a determined channel impulse response determined during a pilot period of a frame to determine the difference in phase between the channel impulse responses; and
      means for determining if at least one of phase slip occurrence and channel estimate deviation has occurred based on the determined difference.

20. A system according to claim 19, wherein said means for comparing comprises means for comparing a determined channel impulse response determined during an information period of the received frame corresponding to a first information symbol to a determined channel impulse response determined during a pilot period of a frame corresponding to a pilot symbol immediately subsequent to the first information symbol to determine the difference in phase between the channel impulse responses.

21. A system according to claim 20, wherein the determined channel impulse response determined during a pilot period of a frame corresponding to a pilot symbol immediately subsequent to the first information symbol is determined by re-determining channel impulse responses in a reverse direction from determined channel impulse responses corresponding to pilot symbols subsequent to the pilot symbol immediately subsequent to the first information symbol.

22. A system according to claim 19, further comprising means for discarding the determined channel impulse response corresponding to the first information symbol and subsequently tracking utilizing the determined channel estimate corresponding to a pilot symbol subsequent to the first information symbol.

23. A system according to claim 19, further comprising:
   a channel tracker which estimates the channel impulse response;
   means for placing the channel tracker in a training mode during at least one pilot period of the received frame; and means for placing the channel tracker in decision directed mode during at least one information period the received frame.

24. A system according to claim 23, further comprising:

means for increasing a gain of the channel tracker when the channel tracker is placed in training mode; and means for decreasing the gain of the channel tracker when the channel tracker is placed in decision directed mode.

25. A system according to claim 19, further comprising:

means for comparing determined channel impulse responses for symbols prior to the pilot symbol subsequent to the first information symbol; and means for re-tracking backwards to prior symbols from the pilot symbol immediately subsequent to the first information symbol until the difference between the determined channel impulse response corresponding to the pilot symbol subsequent to the first information symbol and a determined channel impulse response corresponding to a symbol prior to the first information symbol is less than a predefined threshold so as to determine an initial symbol.

26. A system according to claim 25, further comprising:

means for revising symbol estimates utilizing the determined channel impulse response corresponding to the pilot symbol subsequent to the initial symbol and until and including the first information symbol.

27. A system according to claim 25, further comprising:

a channel tracker which estimates the channel impulse response;

means for placing the channel tracker in a training mode during at least one pilot period of the received frame; and means for placing the channel tracker in decision directed mode during at least one information period the received frame.

28. A system according to claim 27, further comprising:

means for increasing a gain of the channel tracker when the channel tracker is placed in training mode; and means for decreasing the gain of the channel tracker when the channel tracker is placed in decision directed mode.

\* \* \* \* \*